United States Patent
Lee et al.

(10) Patent No.: US 8,590,662 B2
(45) Date of Patent: Nov. 26, 2013

(54) STRUCTURE FOR MOUNTING TRANSMISSION TO VEHICLE BODY AND BRACKET FOR MOUNTING TRANSMISSION TO VEHICLE BODY

(75) Inventors: Hyun Ku Lee, Seoul (KR); Min Sung Baik, Seoul (KR); Moo Suk Kim, Hwaseong-si (KR); Kyoung Wook Kim, Seongnam-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 47 days.

(21) Appl. No.: 13/270,621

(22) Filed: Oct. 11, 2011

(65) Prior Publication Data
US 2012/0261543 A1 Oct. 18, 2012

(30) Foreign Application Priority Data
Apr. 18, 2011 (KR) .................. 10-2011-0035521

(51) Int. Cl.
*B62D 21/10* (2006.01)
(52) U.S. Cl.
USPC ........................... 180/312; 180/377; 248/638
(58) Field of Classification Search
CPC ....................................................... B62D 21/09
USPC ........... 180/312, 346, 377, 381; 248/638, 374
See application file for complete search history.

(56) References Cited

U.S. PATENT DOCUMENTS

| | | | | |
|---|---|---|---|---|
| 1,406,316 | A * | 2/1922 | Whitten | 180/377 |
| 4,509,475 | A * | 4/1985 | Visek | 123/195 A |
| 4,648,475 | A * | 3/1987 | Veglia | 180/297 |
| 5,174,541 | A * | 12/1992 | Hutter et al. | 248/636 |
| 5,718,407 | A * | 2/1998 | Lee | 248/634 |
| 6,223,850 | B1 * | 5/2001 | Rajca et al. | 180/377 |
| 6,230,585 | B1 * | 5/2001 | Bator | 74/606 R |
| 6,378,832 | B1 * | 4/2002 | Li et al. | 248/637 |
| 7,575,250 | B2 * | 8/2009 | Werner et al. | 280/781 |
| 7,789,189 | B2 * | 9/2010 | Bigg et al. | 180/377 |
| 7,976,290 | B2 * | 7/2011 | Wang | 417/360 |
| 2004/0245037 | A1 * | 12/2004 | Aoyama et al. | 180/312 |
| 2005/0098374 | A1 * | 5/2005 | Moon | 180/312 |
| 2009/0095558 | A1 * | 4/2009 | Bigg et al. | 180/312 |
| 2009/0283352 | A1 * | 11/2009 | Hornisch et al. | 180/312 |
| 2012/0261543 | A1 * | 10/2012 | Lee et al. | 248/638 |

* cited by examiner

*Primary Examiner* — Karen Beck
(74) *Attorney, Agent, or Firm* — Morgan, Lewis & Bockius LLP

(57) ABSTRACT

A structure for mounting a transmission to a vehicle body may include a transmission mounting bracket coupled both to a transmission casing of the transmission and to a rear cover coupled to the transmission casing, wherein the transmission mounting bracket may be coupled to an insulator, and the insulator may be mounted to the vehicle body.

3 Claims, 4 Drawing Sheets structure of conventional art          structure of present invention

STRUCTURE FOR MOUNTING TRANSMISSION TO VEHICLE BODY AND BRACKET FOR MOUNTING TRANSMISSION TO VEHICLE BODY

CROSS-REFERENCE TO RELATED APPLICATIONS

The present application claims priority to Korean Patent Application No. 10-2011-0035521 filed on Apr. 18, 2011, the entire contents of which is incorporated herein for purposes by this reference.

BACKGROUND OF THE INVENTION

1. Field of the Invention

The present invention relates to a structure for mounting a transmission to a vehicle body and a bracket for mounting the transmission to the vehicle body that can enhance coupling force between the transmission and the vehicle body so that noise and vibration generated in the vehicle body by the operation of a powertrain are mitigated.

2. Description of Related Art

Generally, a transmission that forms a powertrain along with an engine changes rotational force and speed of the engine in response to drive conditions of the vehicle before transmitting the power to drive wheels. The transmission has a transmission housing. The transmission housing includes a transmission casing that protects a variety of components of the transmission, and a rear cover that closes an open rear end of the transmission casing.

As shown in FIGS. 1 and 2, such a transmission 10 is mounted to a vehicle body 40 by a transmission mounting bracket 20 in such a way that a rear cover 13 is oriented towards the rear of the vehicle.

In detail, in the structure for mounting the transmission 10 to the vehicle body 40 according to the conventional art, the transmission mounting bracket 20 is coupled to an upper end of a transmission casing 11. The transmission mounting bracket 20 is coupled to an insulator 30 by a bolt 31. The insulator 30 is mounted to the vehicle body 40.

Typically, the transmission mounting bracket 20 is coupled to the upper end of the transmission casing 11 by four bolts 50 to form a four-point fastening structure.

However, in the conventional mounting structure, because only the transmission casing 11 is coupled to the transmission mounting bracket 20, a minimum distance L1 between the vehicle body 40 and the coupling points M1 at which the transmission mounting bracket 20 is coupled to the transmission casing 11 by the bolts 50 is comparatively long. Thereby, considering the weight of the powertrain, the coupling force between the transmission 10 and the vehicle body 40 is comparatively low.

As such, in conditions of the comparatively low coupling force between the transmission 10 and the vehicle body 40, vibration and noise that are generated by the operation of the oil pump, belts, and gears are amplified and then transmitted to the vehicle body 40. An excessive amount of noise and vibration transmitted to the vehicle body 40 resulting from the operation of the powertrain induces dissatisfaction of consumers.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for mounting a transmission to a vehicle body and a bracket for mounting the transmission to the vehicle body that can enhance coupling force between the transmission and the vehicle body so that noise and vibration transmitted to the vehicle body are mitigated, thus improving consumer preferences for the vehicle.

In an aspect of the present invention, a structure for mounting a transmission to a vehicle body may include a transmission mounting bracket coupled both to a transmission casing of the transmission and to a rear cover coupled to the transmission casing, wherein the transmission mounting bracket may be coupled to an insulator, and the insulator may be mounted to the vehicle body.

The transmission mounting bracket may be coupled both to an upper end of the transmission casing and a rear surface of the rear cover that faces the vehicle body.

The transmission mounting bracket may be coupled to the upper end of the transmission casing by bolts at at least four fastening points, and the transmission mounting bracket may be coupled to the rear cover by a bolt at at least one fastening point.

A position at which the transmission mounting bracket may be coupled to the rear cover may be adjacent to the upper end of the transmission casing.

In another aspect of the present invention, a bracket for mounting a transmission to a vehicle body, may include a base plate coupled to a transmission casing of the transmission, a rear flange bent from the base plate and extending in a predetermined length therefrom, the rear flange being coupled to an insulator, and a flange boss extending from the rear flange, the flange boss being coupled to a rear cover coupled to the transmission casing of the transmission.

The insulator may be mounted to the vehicle body.

The base plate may be coupled to an upper end of the transmission casing, and the flange boss extends downwards with respect to the base plate and may be coupled to a rear surface of the rear cover that faces the vehicle body.

At least four bolt holes may be formed through the base plate so that the base plate may be coupled to the upper end of the transmission casing by bolts through the bolt holes, and at least one bolt hole may be formed through the flange boss so that the flange boss may be coupled to the rear surface of the rear cover by a bolt through the bolt hole.

A reinforcing stepped portion may be formed in a medial portion of the base plate and extends toward the rear flange.

Reinforcing side flanges may be provided on both side edges of the base plate so that the side flanges may be integrally connected to the base plate and the rear flange.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
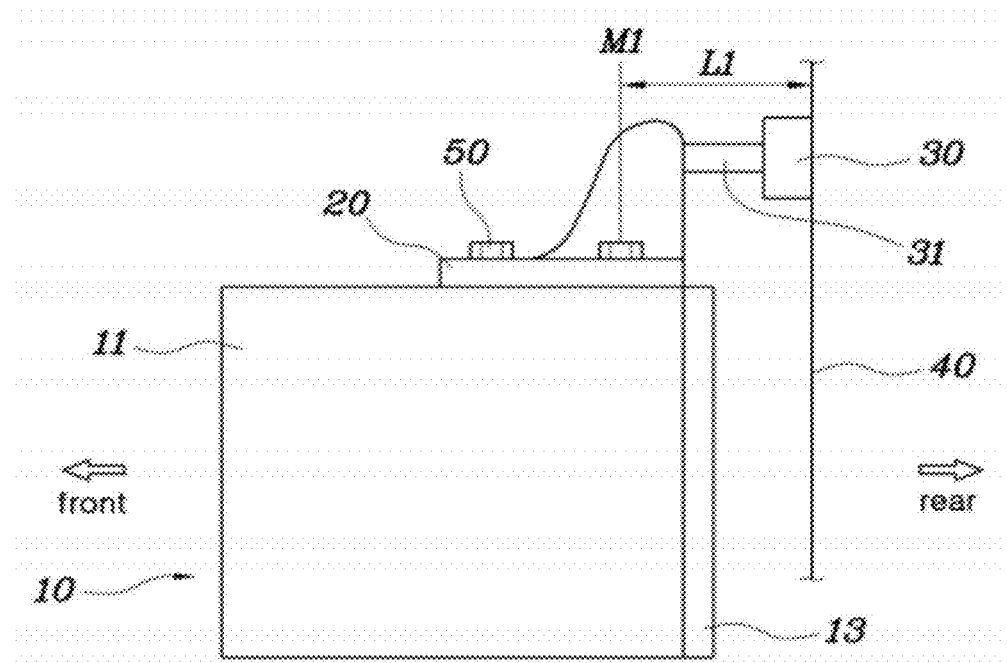
FIG. 1 is a schematic view illustrating a structure for mounting a transmission to a vehicle body, according to a conventional art.
Figure 2:
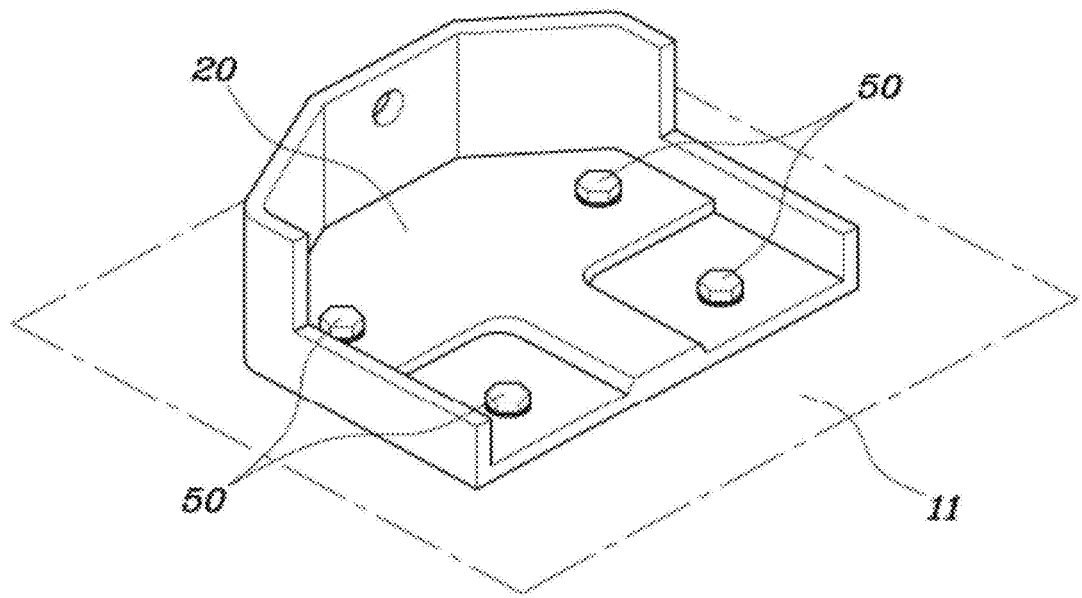
FIG. 2 is a view showing a transmission mounting bracket fastened to an upper end of a transmission casing according to the conventional mounting structure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a preferred embodiment of the present invention will be described in detail with reference to the attached drawings.

Figure 3:
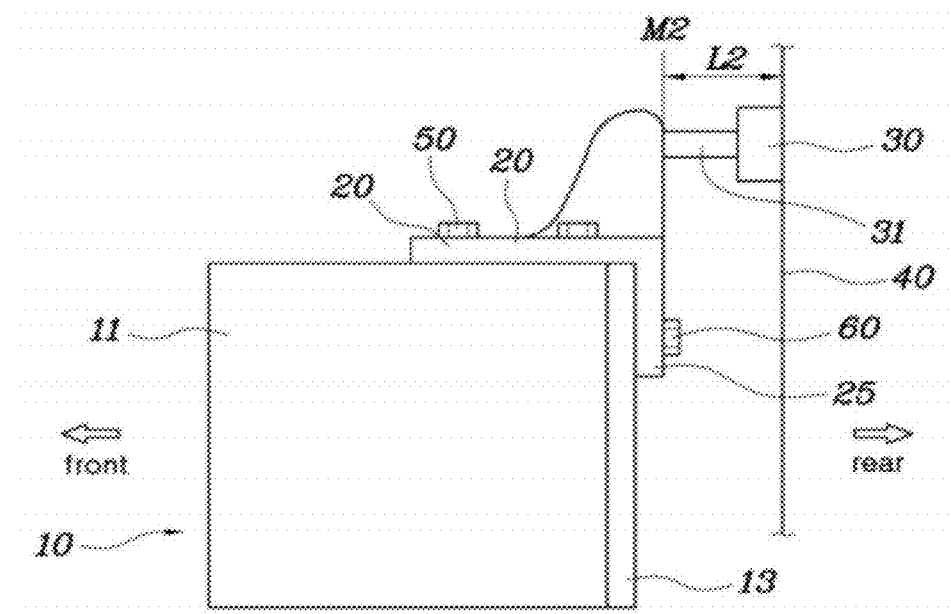
FIG. 3 is a schematic view illustrating a structure for mounting a transmission to a vehicle body, according to an exemplary embodiment of the present invention.
Figure 4:
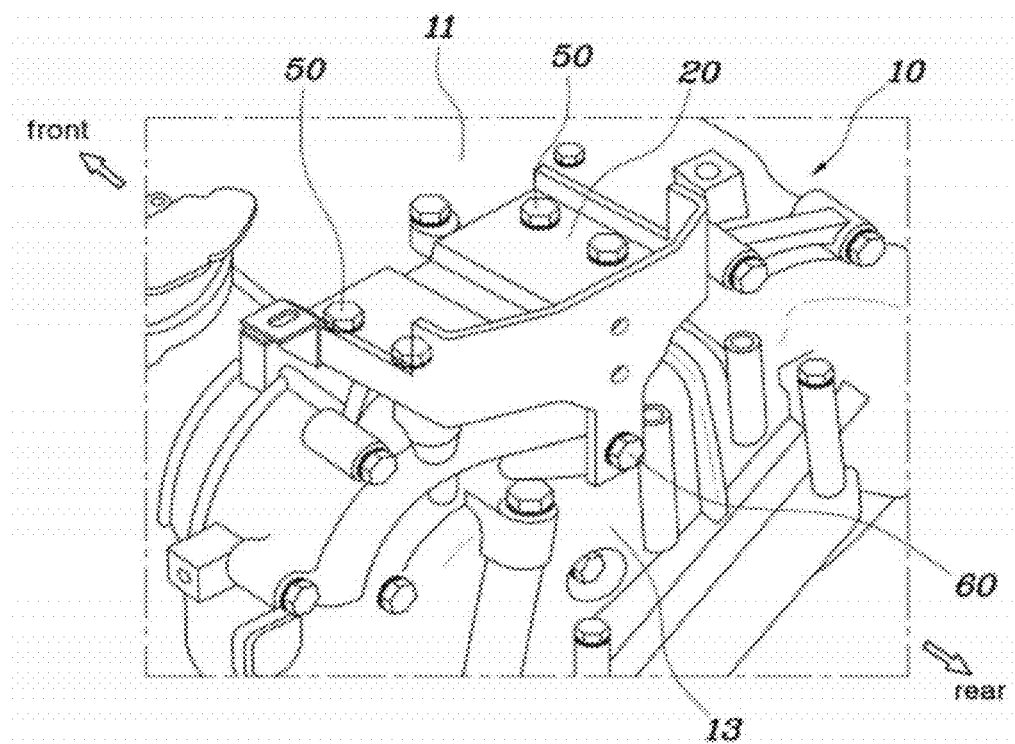
FIG. 4 is a view showing a transmission mounting bracket fastened to an upper end of a transmission casing and to a rear cover according to an exemplary embodiment of the present invention.
Figure 5:
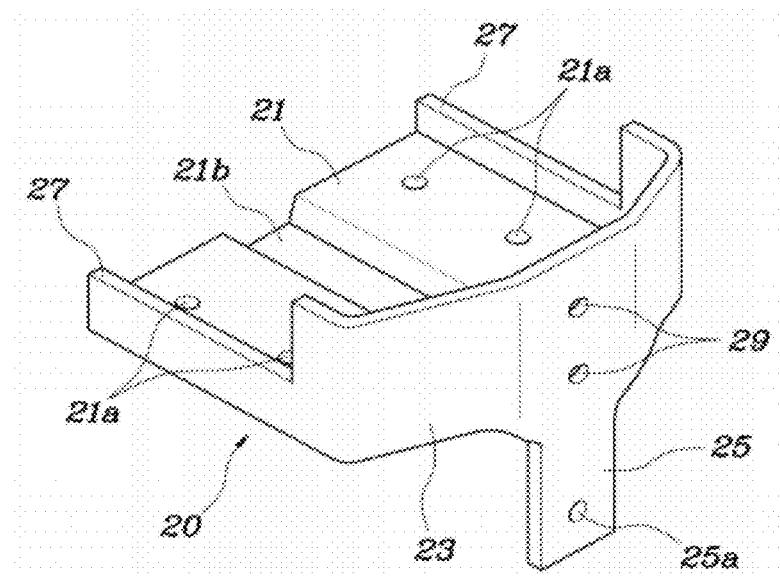
FIG. 5 is a perspective view of the transmission mounting bracket used in the mounting structure according to an exemplary embodiment of the present invention.

As shown in FIGS. 3 through 5, a transmission 10 for a vehicle includes a transmission housing. The transmission housing includes a transmission casing 11 that contains components therein and protects them, and a rear cover 13 that closes an open rear end of the transmission casing 11. The present invention is characterized by increasing the coupling force between the transmission 10 and the vehicle body 40.

To accomplish the above purpose, in the exemplary embodiment of the present invention, a transmission mounting bracket 20 is coupled both to the transmission casing 11 and to the rear cover 13 coupled to the transmission casing 11. In addition, the transmission mounting bracket 20 is coupled to an insulator 30 by a bolt 31, and the insulator 30 is coupled to the vehicle body 41.

In other words, the transmission mounting bracket 20 is mounted to the transmission 10 in such a way that it is coupled both to an upper end of the transmission casing 11 and to a rear surface of the rear cover 13 that faces the vehicle body 40.

In detail, the transmission mounting bracket 20 is coupled to the upper end of the transmission casing 11 by bolts 50 at at least four coupling points. The transmission mounting bracket 20 is coupled to the rear cover 13 by a bolt 60 at at least one coupling point.

Furthermore, it is preferable for the position at which the transmission mounting bracket 20 is coupled to the rear cover 13 to be adjacent to the upper end of the transmission casing 11. The reason for this is to maximize the coupling force between the transmission mounting bracket 20 and the rear cover 13.

That is, if the position at which the bolt 60 is tightened into the rear cover 13 is lower than that shown in FIG. 3, and as it is further away from the upper end of the transmission casing 11, the coupling force that is generated by the bolt 60 between the transmission mounting bracket 20 and the rear cover 13 is reduced. To avoid this and to maximize the coupling force between the transmission mounting bracket 20 and the rear cover 13, the transmission mounting bracket 20 is coupled to the rear cover 13 by the bolt 60 at a position adjacent to the upper end of the transmission casing 11.

The transmission mounting bracket 20 that is used in an exemplary embodiment of the present invention to realize the above-stated characteristic structure of the present invention includes a base plate 21, a rear flange 23 and a flange boss 25. The base plate 21 is coupled to the transmission casing 11. The rear flange 23 is bent from the base plate 21, extends therefrom, and is coupled to the insulator 30 by the bolt 31. The flange boss 25 extends from the rear flange 23 and is coupled to the rear cover 13 coupled to the transmission casing 11. The insulator 30 is fastened to the vehicle body 40.

The base plate 21 is fastened to the upper end of the transmission casing 11. The flange boss 25 extends downward from the base plate 21 and is fastened to the rear surface of the rear cover 13 that faces the vehicle body 40. The base plate 21 has at least four bolt holes 21a through which the bolts 50 are tightened into the transmission casing 11 to fasten the base plate 21 to the upper end of the transmission casing 11. The flange boss 25 has at least one bolt hole 25a through which the bolt 60 is tightened into the rear cover 13 to fasten the flange boss 25 to the rear surface of the rear cover 13.

Furthermore, the transmission mounting bracket 20 according to the exemplary embodiment of the present invention is preferably configured such that a stepped portion 21b is formed in a medial portion of the base plate 21 in a longitudinal direction of the vehicle body to enhance the strength of the bracket 20. In addition, side flanges 27 for reinforcing the bracket 20 are preferably provided on both side edges of the base plate 21 in such a way that the side flanges 27 are integrally connected to the base plate 21 and the rear flange 23.

As such, in an exemplary embodiment of the present invention, the transmission mounting bracket 20 includes the flange boss 25 in such a way that when the base plate 21 of the transmission mounting bracket 20 is coupled to the upper end of the transmission casing 11, the flange boss 25 is coupled to the rear surface of the rear cover 13 that faces the vehicle body 40. Thus, a minimum distance L2 between the vehicle body 40 and the coupling points M2 at which the transmission mounting bracket 20 is coupled to the transmission 10 by the bolts 50 is markedly reduced. Thereby, the force with which the transmission 10 is coupled to the vehicle body 40 can be markedly enhanced.

In other words, in the conventional art, the transmission mounting bracket 20 is coupled only to the upper end of the transmission casing 11, so that the minimum distance between the vehicle body 40 and a coupling point M1 at which the transmission mounting bracket 20 is coupled to the transmission casing 11 is L1.

However, in an exemplary embodiment of the present invention, the transmission mounting bracket 20 is coupled both to the upper end of the transmission casing 11 and to the rear cover 13. Thus, the minimum distance between the vehicle body 40 and the coupling points M2 at which the transmission mounting bracket 20 is coupled to the transmission 10 is L2, which is markedly less than L1 of the conventional art.

As such, when the minimum distance L2 between the vehicle body 40 and the coupling points M2 of the transmission 10 is markedly less than that of the conventional art, the coupling force between the transmission 10 and the vehicle body 40 is markedly increased compared to that of the conventional art, particularly considering the weight of the powertrain. As a result, the present invention can reliably reduce vibration and noise that are generated during the operation of the oil pump, belts, and gears and are transmitted to the vehicle body 40.

Therefore, in an exemplary embodiment of the present invention, the enhanced coupling force between the transmission 10 and the vehicle body 40 markedly reduces vibration and noise generated by the operation of the powertrain in the vehicle body 40. Thereby, consumer preferences for vehicles can be increased, thus enhancing the marketability of the vehicles.

Figure 6:
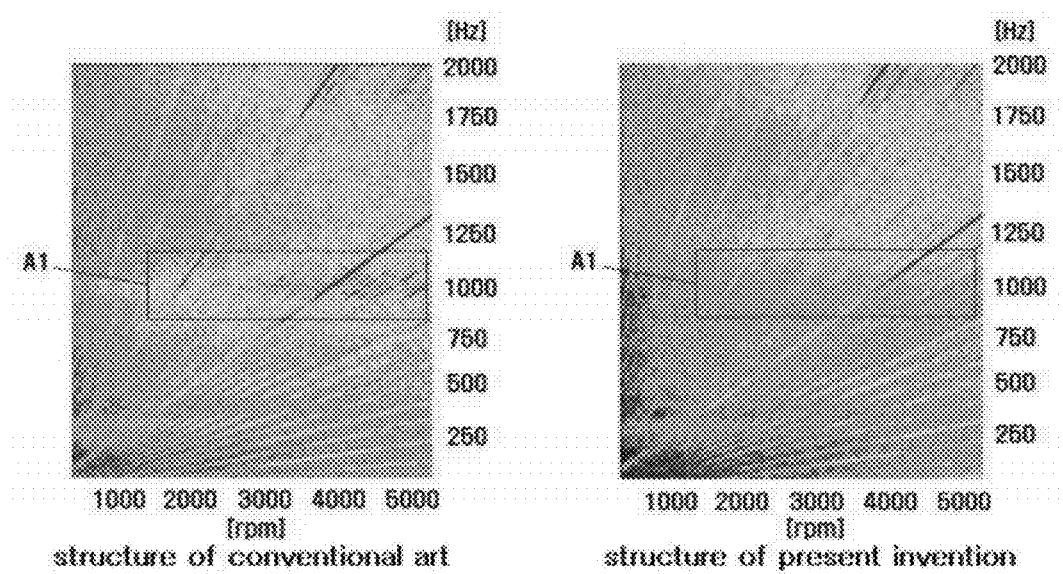
FIGS. 6 and 7 are diagramic charts comparing the magnitudes of noise and sound generated from the vehicle body in the mounting structure of the present invention to those of the conventional mounting structure.

FIG. 6 shows an analysis of vibration generated in the vehicle body 10 when the oil pump is operated. The magnitude of vibration generated in the vehicle body 40 by the operation of the oil pump is largest in a band A1 at around 1000 Hz. As can be understood from the results of measurement in the band A1 at around 1000 Hz, the mounting structure of the present invention reduced vibration by about 10 dB compared to that of the mounting structure of the conventional art.

Figure 7:
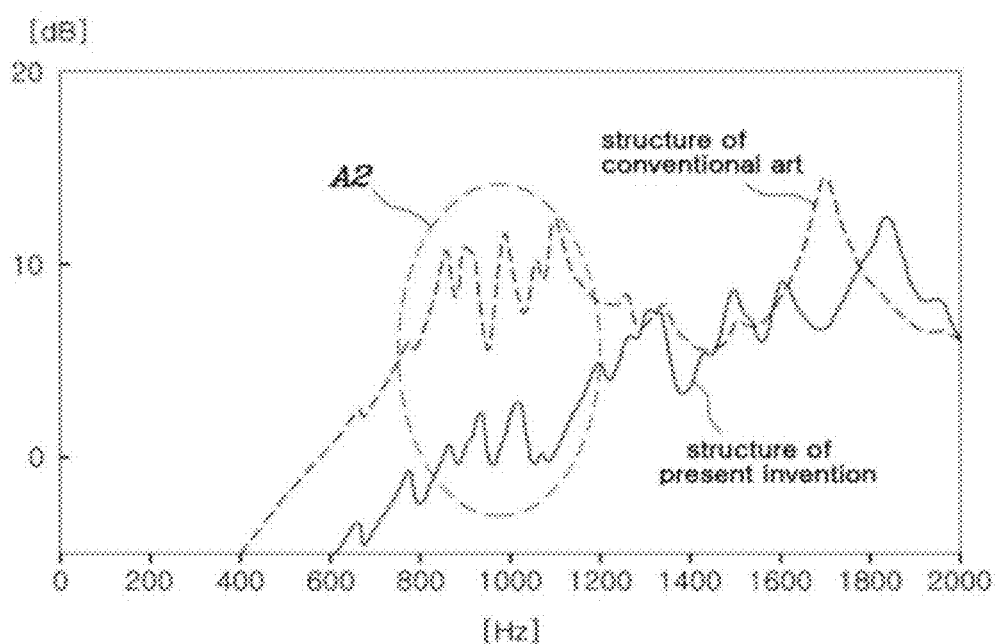

Furthermore, FIG. 7 is a diagramic chart showing the magnitude of noise generated in the vehicle body 40 by the operation of the belts of the powertrain. The magnitude of noise generated by the belts is largest in a band A2 ranging from about 750 Hz to about 1100 Hz. As can be understood from the results of measurement in the band A2 ranging from about 750 Hz to about 1100 Hz, the mounting structure of the present invention reduced vibration by about 10 dB compared to that of the mounting structure of the conventional art.

Meanwhile, in FIGS. 4 and 5, reference numeral 29 denotes a bolt hole formed in the rear flange 23 of the transmission mounting bracket 20. The bolt 31 for coupling to the insulator 30 is tightened into the bolt hole 29.

As described above, in an exemplary embodiment of the present invention, a transmission mounting bracket can enhance coupling force between a transmission and a vehicle body. Thereby, vibration and noise generated in the vehicle body by the operation of the powertrain can be markedly reduced, thus improving consumer preferences for the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bracket for mounting a transmission to a vehicle body, comprising:
 a base plate coupled to a transmission casing of the transmission;
 a rear flange bent from the base plate and extending in a predetermined length therefrom, the rear flange being coupled to an insulator; and
 a flange boss extending from the rear flange, the flange boss being coupled to a rear cover coupled to the transmission casing of the transmission;
 wherein the insulator is mounted to the vehicle body;
 wherein the base plate is coupled to an upper end of the transmission casing, and the flange boss extends downwards with respect to the base plate and is coupled to a rear surface of the rear cover that faces the vehicle body; and
 wherein at least four bolt holes are formed through the base plate so that the base plate is coupled to the upper end of the transmission casing by bolts through the bolt holes, and
 at least one bolt hole is formed through the flange boss so that the flange boss is coupled to the rear surface of the rear cover by a bolt through the bolt hole.

2. The bracket as set forth in claim 1, wherein a reinforcing stepped portion is formed in a medial portion of the base plate and extends toward the rear flange.

3. The bracket as set forth in claim 1, wherein reinforcing side flanges are provided on both side edges of the base plate so that the side flanges are integrally connected to the base plate and the rear flange.

* * * * *